US007257109B2

(12) United States Patent
Sylvain

(10) Patent No.: US 7,257,109 B2
(45) Date of Patent: Aug. 14, 2007

(54) DYNAMIC CALL CONTROL

(76) Inventor: Dany D. Sylvain, 6 rue d'Anjou, Gatineau, Quebec (CA) J8T 6A6

( * ) Notice: Subject to any disclaimer, the term of this patent is extended or adjusted under 35 U.S.C. 154(b) by 1109 days.

(21) Appl. No.: 10/142,805

(22) Filed: May 8, 2002

(65) Prior Publication Data
US 2007/0160031 A1    Jul. 12, 2007

(51) Int. Cl.
*H04L 12/66* (2006.01)
(52) U.S. Cl. ............... 370/352; 370/401; 370/466
(58) Field of Classification Search .......... None
See application file for complete search history.

(56) References Cited
U.S. PATENT DOCUMENTS

| 6,175,856 | B1 | 1/2001 | Riddle | 709/204 |
|---|---|---|---|---|
| 6,799,210 | B1 * | 9/2004 | Gentry et al. | 709/223 |
| 6,888,839 | B1 * | 5/2005 | Scoggins et al. | 370/410 |
| 6,996,094 | B2 * | 2/2006 | Cave et al. | 370/356 |
| 7,006,433 | B1 * | 2/2006 | Dantu et al. | 370/218 |
| 7,046,683 | B1 * | 5/2006 | Zhao | 370/401 |
| 2001/0036176 | A1 * | 11/2001 | Girard | 370/352 |
| 2002/0141386 | A1 * | 10/2002 | Minert et al. | 370/352 |
| 2002/0159439 | A1 * | 10/2002 | Marsh et al. | 370/352 |
| 2003/0091032 | A1 * | 5/2003 | Laxman et al. | 370/352 |
| 2003/0193696 | A1 * | 10/2003 | Walker et al. | 358/402 |
| 2004/0196833 | A1 * | 10/2004 | Dahan et al. | 370/352 |

FOREIGN PATENT DOCUMENTS

| EP | 1 161 038 A2 | 5/2001 |
|---|---|---|
| GB | 2 350 257 A | 11/2000 |
| WO | WO 00/70885 | 11/2000 |

* cited by examiner

*Primary Examiner*—Phirin Sam
(74) *Attorney, Agent, or Firm*—Withrow & Terranova, PLLC

(57) ABSTRACT

The present invention allows an originating media gateway to advertise available resources so that one or more media gateway controllers can interact with a terminating media gateway to determine the best communication scheme to use when establishing a communication session between the originating and terminating media gateways. The communication scheme is selected based on the capabilities of the terminating media gateway in light of the resources advertised by the originating media gateway. The communication scheme for any given call is selected dynamically on a call-by-call basis.

31 Claims, 4 Drawing Sheets

DYNAMIC CALL CONTROL

FIELD OF THE INVENTION

The present invention relates to telecommunications, and particularly, to providing call control over various packet technologies.

BACKGROUND OF THE INVENTION

Many initial deployments of packet-based telephony networks are using ATM as the core packet technology. The preferred architecture for packet telephony uses media gateways that interface to existing telephony equipment like telephones or TDM-based trunk or access lines and perform the necessary adaptation to a packet format. Media gateways are controlled by media gateway controllers that perform call processing and service processing and control the setup and teardown of connections between media gateways. Connections are established over a generic packet core network that can be used to provide a variety of services relating to data, video and voice.

Currently, asynchronous transfer mode (ATM) networks are favored to support voice communications, as these packet networks are sufficiently mature to meet the stringent Quality of Service (QoS) requirements associated with telephony communications. However, the extensive acceptance of the Internet Protocol for most other applications is indicative of the fact that voice communications may ultimately be carried using the Internet Protocol. Many network operators deploying ATM-based telephony solutions have expressed the desire to evolve their ATM-based investment toward IP. Although many evolution and transition paths are possible, none so far have been able to preserve the investment made in ATM equipment or to provide a smooth migration from ATM to IP while keeping the telephony services operational. For example, media gateways have traditionally only supported either voice over IP (VoIP) or voice over ATM (VoATM). With the rigidity of current architectures, the transition from one format to another requires replacing one network with another, with little opportunity for a gradual transition. Accordingly, there is a need for a way to transition from one network technology to another in a reliable and cost effective manner. Further, there is a need to transition from a VoATM format to VoIP in a reliable and efficient manner.

SUMMARY OF THE INVENTION

The present invention provides a way to dynamically provide call processing on a call-by-call basis using different communication schemes. Initially, an originating media gateway advertises multiple available resources in a call signaling message sent to a supporting media gateway controller to initiate a call. The available resources are sufficient to identify the different, available communication capabilities of the originating media gateway, and preferably ports corresponding to the communication capabilities. The ports identify the location and address in which the originating media gateway can send and receive packets from a terminating media gateway during a communication session. The communication capabilities for any given port will preferably identify the communication scheme, such as VoIP, VoATM, for carrying voice and any related formatting and compression capabilities.

In one embodiment, the media gateway controller supporting the originating media gateway interacts with the terminating media gateway directly or indirectly via another media gateway controller to determine a compatible communication scheme and available port on the terminating media gateway to send packets using the selected communication scheme. Preferably, the advertised resources of the originating media gateway are passed to the terminating media gateway, which will select a compatible communication scheme and port at which to receive and send packets based on the advertised resources. For example, if the advertised resources indicate the originating media gateway supports VoIP at one port and VoATM at another port, the terminating media gateway will determine whether to use VoATM or VoIP to use for the call based on its capability. If the terminating media gateway can only support VoATM, then it will select VoATM to use for the call, and vice versa. After selecting a compatible communication scheme, the terminating media gateway will then send a message identifying the selected port and any necessary communication capabilities to its supporting media gateway controller, which will forward the information to the media gateway controller supporting the originating media gateway. The information is then passed to the originating media gateway, which can determine which communication scheme to use and a port to which packets should be transmitted based on the communication scheme selected by the terminating media gateway.

In another embodiment, the originating media gateway controller and terminating gateway controller are actually the same device. This would be the case if the originating and terminating points are under the control of the same media gateway controller. In this case, the media gateway port and communication capabilities are passed back and forth between the media gateways via only one media gateway controller. In another embodiment, the terminating media gateway controller selects the appropriate port and communication capability on behalf of the terminating media gateway, based on the known characteristics of the media gateways available to the media gateway controller. This method can be used in particular in situations where multiple media gateways can terminate the connection and picking one versus another media gateway might be more efficient. A further improvement would add a cost metric for each of the communication capabilities to the information passed from the originating media gateway to the terminating media gateway. This way, if the terminating media gateway can use any of the capabilities, it can select the one that has the lowest cost metric, helping to optimize the network operation.

If the advertised resources include the ports corresponding to the communication schemes of the originating media gateway, the terminating media gateway can determine the port to which to send packets based on the selected communication scheme. As such, both the originating and terminating media gateways have a communication scheme to use and ports to which to send packets. The present invention allows the originating media gateway to advertise available resources so that the media gateway controllers can interact with the terminating media gateway to determine the best way to establish a communication session for the call. The communication scheme is selected based on the capabilities of the terminating media gateway in light of the resources advertised by the originating media gateway. The communication scheme for any given call is selected dynamically on a call-by-call basis. Accordingly, media gateways can support multiple formats and cooperate with the media gateway controllers to select a format compatible with another media gateway to facilitate a transition from one format to another.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS FIGURES

The accompanying drawing figures incorporated in and forming a part of this specification illustrate several aspects of the invention, and together with the description serve to explain the principles of the invention.

Other aspects and features of the present invention will become apparent to those ordinarily skilled in the art upon reviewing the following description of the preferred embodiments of the invention in conjunction with the accompanying figures.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
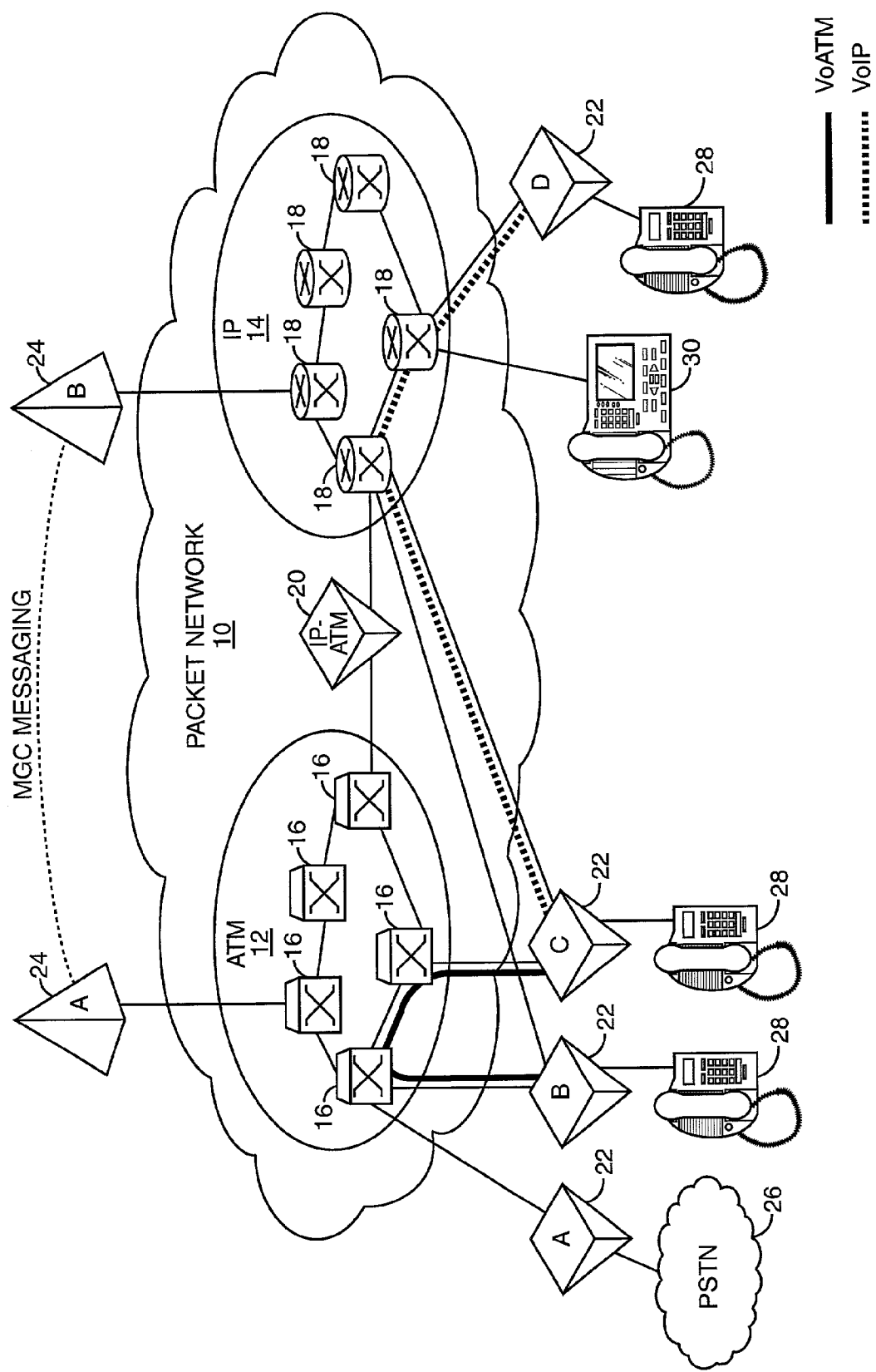
FIG. 1 is an overview of a communication network according to a first embodiment of the present invention.

With reference to FIG. 1, a communication environment according to the present invention is shown centered about a generic packet network 10 encompassing an asynchronous transfer mode (ATM) network 12 and an Internet Protocol (IP) network 14. The ATM network 12 includes numerous interconnected ATM switches 16, while the IP network 14 includes numerous interconnected routers 18 in traditional fashion. The ATM network 12 and IP network 14 may require a translation device, or like gateway 20, to facilitate protocol and physical layer interworking in select embodiments.

In addition to supporting various packet-based applications and services, the packet network 10 is increasingly being used to support communications that originate or terminate on circuit-switched devices of the public switched telephone network (PSTN) or terminate traditional telephone lines. Although the origination or termination devices transmit and receive circuit-switched signals, these signals are converted to packets for transport over the packet network 10.

To facilitate interworking of circuit-switched and packet communications, there are two primary elements: a media gateway 22 and a media gateway controller 24. The media gateway 22 provides the actual interface between the packet network 10 and the endpoints of various subscribers' PSTN circuits. The media gateway controller 24 provides decision-making and coordination between media gateways 22 to facilitate interworking.

The primary responsibility of a media gateway 22 is to adapt the telephony interfaces to allow them to use the packet network 10. Media gateways 22 are configured to allow media to be transportable, both as packets for the IP or ATM networks 12, 14 and as analog or digital streams in more traditional telephony networks.

For the purpose of describing the preferred embodiments of the present invention, the following description assumes the media gateways 22 provide a bi-directional interface between a circuit-switched network, such as the TDM-based PSTN 26 and media-related elements in an ATM or IP network 12, 14. It is also assumed that the media gateways 22 will interact either with telephony end user applications residing in computers or packet-based telephones 30 attached to the ATM or IP networks 12, 14, with end user telephones 28, or with other media gateways 22. It is important to understand that the media gateways 22 can implement a variety of physical interfaces to the PSTN 26. For example, the media gateway 22 may implement high-speed TDM trunk interfaces or line interfaces, which are commonly used interfaces between switching elements in a circuit-switched network. Thus, media gateways 22 provide an interface to a plurality of endpoints, such as telephones 28 that correspond to telephone numbers in a PSTN network. On the other side of the media gateway 22, the interface will connect to the packet network 10 to communicate with one or more media gateway controllers 24 and other media gateways 22. Certain of the media gateways 22 will support multiple communication schemes using various packet-based technologies.

The primary responsibilities of the media gateway controller 24 are to make decisions based on flow-related information and to provide instructions on interconnecting elements or endpoints within and throughout the networks. Media gateway controllers 24 store status information on media flows and may be used to generate administrative records for a variety of media-related activities, such as billing. Most prominently, media gateway controllers 24 provide coordination of media gateways 22. Typically, media gateway controllers 24 direct media gateways 22 to set up, handle, and end individual media flows, which will take place between the respective media gateways. As an analogy, media gateway controllers 24 would implement the call control functionality found in switching elements in the PSTN. The switching elements that provide the media path for the call are analogous to the media gateways 22. Notably, this disclosure assumes the replacement of switching elements of the PSTN with media gateways 22 and media gateway controllers 24.

In the illustrated example, media gateway A (22) provides a trunking interface between a portion of the PSTN 26 and the ATM network 12. Media gateways B and C (22) may provide line interfaces to numerous traditional telephones 28 and support connectivity to both the ATM network 12 and the IP network 14. As will be described further below, certain gateways, such as media gateways B and C (22), may be equipped with multiple interfaces capable of connecting to different networks supporting different communication schemes. Preferably, the multiple interfaces will include an interface for handling a current standard and another interface for handling a standard to which the industry is moving, to allow existing equipment to handle a transition from one standard to another. For the present example, assume that gateways B and C (22) have one ATM interface connected to the ATM network 12 and one IP interface connected to the IP network 14. The interface to the ATM network 12 will support Voice over ATM (VoATM), and the interface to the IP network 14 will support Voice over IP (VoIP). Further, media gateway D (22) may have a single interface with the IP network 14 supporting VoIP. Media gateway D (22) will also support one or more circuit-switched telephones 28.

Accordingly, when a telephone 28 supported by media gateway C (22) needs to communicate with a telephone 28 supported by media gateway B (22), VoATM may be used for the packet communications between the respective media gateways C and B (22). Alternatively, VoIP could also be used, as both B (22) and C (22) support VoIP as well. When a telephone 28 supported by media gateway C (22) needs to communicate with a telephone 28 supported by media gateway D (22), VoIP will be used for the packet communications between the respective media gateways C and D (22), since D (22) only supports VoIP.

Figure 2:
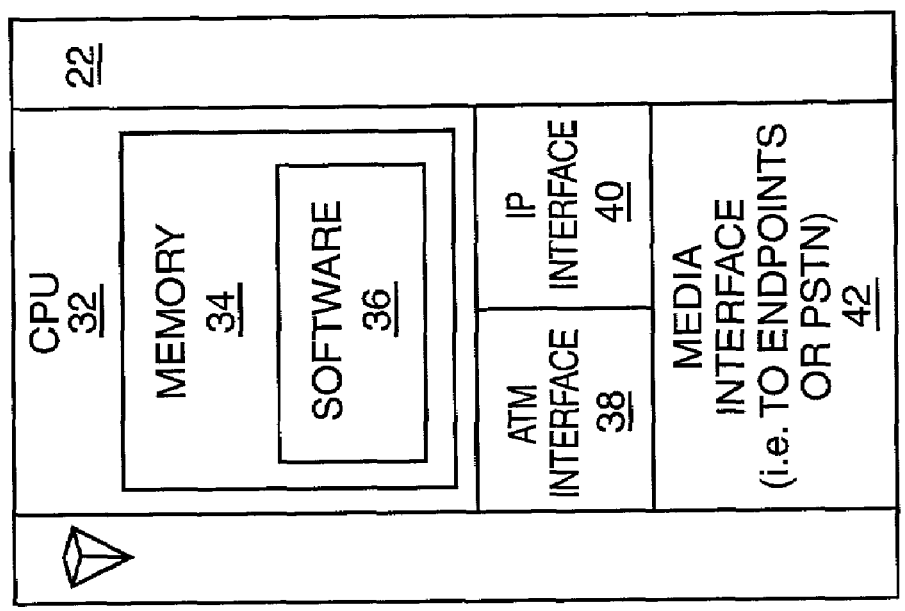
FIG. 2 is a block representation of a media gateway according to the present invention.

Referring now to FIG. 2, a block schematic of a media gateway 22 is shown having a central processing unit (CPU) 32 containing memory 34 and the requisite software 36 for operation. The CPU 32 operates to provide a bi-directional interface between one or more packet interfaces, such as the ATM interface 38, the IP interface 40, and the media interface 42. The ATM interface 38 connects to the ATM network 12, the IP interface 40 connects to the IP network 14, as referenced in FIG. 1, while the media interface 42 is the interface opposite the packet network 10 and is preferably a circuit-switched interface supporting traditional trunks and lines of a traditional, circuit-switched telephone network. When interfacing with traditional telephony equipment, the media interface 42 is typically configured to handle TDM communications or any other analog or digital data streams required to facilitate such communications. As illustrated in FIG. 1, the media interface 42 may be a TDM line interface supporting a telephone 28, as shown by media gateway A (22).

Figure 3:
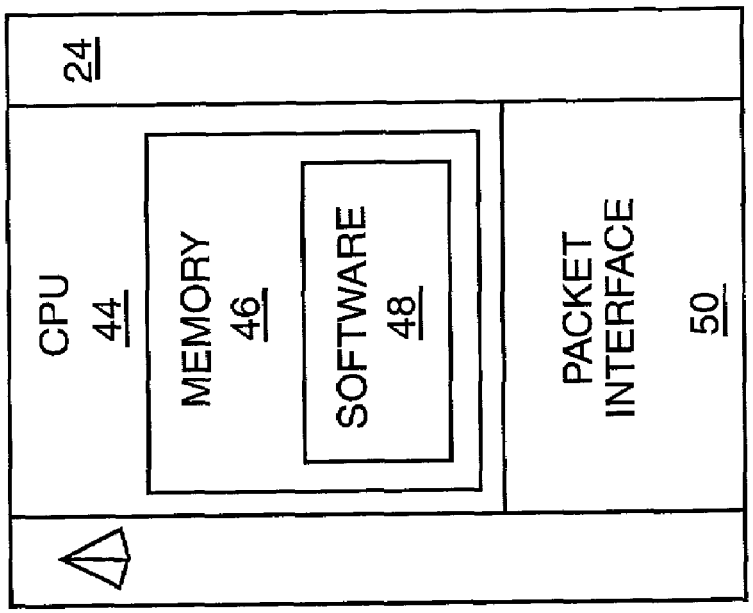
FIG. 3 is a block schematic of a media gateway controller according to the present invention.

FIG. 3 is a block schematic of a media gateway controller 24 having a CPU 44 with associated memory 46 and the requisite software 48 for operation. The media gateway controller 24 will have at least one interface, preferably a packet interface 50 capable of communicating with other media gateway controllers 24 and the associated media gateways 22 across the ATM and IP networks 12, 14. To establish such communications, the media gateway controllers 24 associated with the media gateways 22 supporting the telephones 28 cooperate with one another and the media gateways 22 to establish the communication sessions.

According to the present invention, the originating media gateway 22 advertises multiple available resources in a call signaling message sent to a supporting media gateway controller 24 to initiate a call. The available resources are sufficient to identify the different, available communication capabilities, and preferably ports corresponding to the communication capabilities, of the originating media gateway 22. The ports identify the address or location at which the originating media gateway 22 can receive packets from the terminating media gateway 22 during a communication session. The communication capabilities for any given port will preferably identify the protocol, such as VoIP or VoATM, for carrying voice and any related formatting and compression schemes.

From the multiple advertised resources, the media gateway controller 24 will identify a port on the terminating media gateway 22 capable of supporting a protocol and compression scheme compatible with one of the multiple advertised resources. For example, if the advertised resources indicated the originating media gateway 22 supports VoIP at one port and VoATM at another port, the media gateway controller 24 will determine whether to use VoIP or VoATM for the call based on the capability of the terminating media gateway 22. If the terminating media gateway 22 can only support VoATM, then the media gateway controller 24 will select VoATM to use for the call, and vice versa.

In one embodiment, the media gateway controller 24 supporting the originating media gateway 22 interacts with the terminating media gateway 24 directly or indirectly via another media gateway controller 24 to determine a compatible communication scheme and available port on the terminating media gateway 22 to send packets using the selected communication scheme. Preferably, the advertised resources of the originating media gateway 22 are passed to the terminating media gateway 22, which will select a compatible communication scheme and port at which to receive packets based on the advertised resources. The terminating media gateway 22 will then send a message identifying the selected port and any necessary communication capabilities to its supporting media gateway controller 24, which will forward the information to the media gateway controller 24 supporting the originating media gateway 22. The information is then passed to the originating media gateway 22, which can determine the communication scheme to use and port to which packets should be transmitted based on the communication scheme selected by the terminating media gateway 22.

Notably, if the advertised resources include the ports corresponding to the communication schemes of the originating media gateway 22, the terminating media gateway 22 can determine the port to which to send packets based on the selected communication scheme. As such, both the originating and terminating media gateways 22 have the communication scheme to use and ports to which to send packets. Thus, the present invention allows the originating media gateway 22 to advertise available resources so that the media gateway controllers 24 can interact with the terminating media gateway 22 to determine the best way to establish a communication session for the call. The communication scheme is selected based on the capabilities of the terminating media gateway 22 in light of the resources advertised by the originating media gateway 22. The communication technique for any given call is selected dynamically on a call-by-call basis.

A detailed example is illustrated below in light of the communication environment depicted in FIG. 1. Call signaling between the media gateways 22 and the media gateway controllers 24 may use various protocols, including H.248, MGCP, or proprietary protocols. Call signaling between media gateway controllers 24 may also use various protocols, including SIP for telephony applications (SIP-T) and bearer independent call control (BICC). In the preferred embodiment, the media gateway controllers 24 communicate with each other using a special version of the Session Initiation Protocol (SIP) adapted for implementing telephony communications (SIP-T) over a packet network 10.

In general, SIP is a signaling protocol for creating, modifying, and terminating sessions, such as voice calls or multimedia conferences with one or more participants. SIP-T allows ISUP messages to be transported using SIP encapsulation. Generally, SIP-T carries an ISUP message payload in the body of a SIP message. The SIP header carries translated ISUP routing information. SIP-T also specifies the use of the SIP INFO method for effecting in-call ISUP signaling in IP networks. The specification for SIP is provided in the Internet Engineering Task Force's RFC 2543: Session Initiation Protocol Internet Draft, which is incorporated herein by reference in its entirety. The specification for SIP-T is currently being defined by ITU-T Study Group 11, under WP3 Q11/11 SIP to BICC/ISUP interworking aspects, which are incorporated herein by reference in their entirety along with any formal standard that emerge therefrom.

SIP-T may be used by the media gateway controllers 24 to facilitate packet-based media sessions directly between media gateways 22. The media gateway controllers 24 are generally capable of running an application, generally referred to as a user agent (UA), which is capable of facilitating media sessions using SIP-T.

When a user agent wants to establish a session with a targeted user agent at a terminating media gateway 22, the user agent initiating the session will send an INVITE message and specify the targeted user agent in the TO header of the INVITE message. The targeted user agent will ultimately respond with a 200 OK message, and a session between the respective user agents will be established as per the message exchange required in the SIP-T specification. Communication capabilities are passed between the two user agents of the respective endpoints as parameters embedded within the session setup messages, such as the INVITE, 180 RINGING, and 200 OK messages. The communication capabilities are typically described using the Session Description Protocol (SDP), which is embedded in SIP and SIP-T. Once respective media gateways 22 are in an active session with each other and have determined each other's communication capabilities, the specified media content may be exchanged during an appropriate media session.

Figure 4:
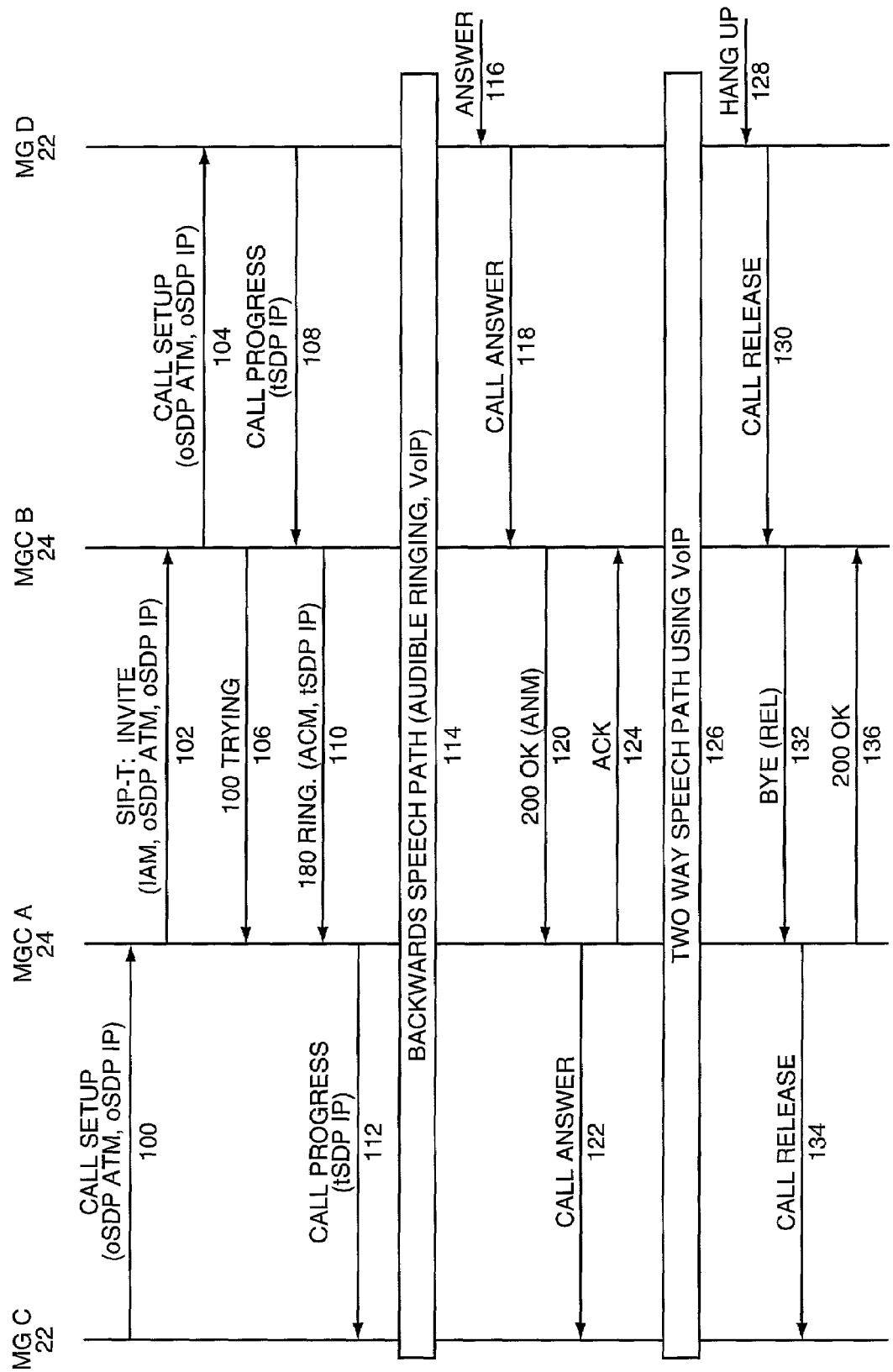
FIG. 4 is a call flow diagram according to one embodiment of the present invention.

With reference to FIG. 4, assume a first telephone 28 supported by media gateway C (22) initiates a call to a second telephone 28 supported by media gateway D (22) by going off-hook and delivering via standard dialing the directory number of the second telephone 28 to media gateway C (22). Media gateway C (22) will send a CALL SETUP message to media gateway controller A (24) (step 100). The CALL SETUP message may include identification of the originating media gateway C (22), the terminating telephone 28, available port addresses, and associated communication capabilities for originating a communication session. The communication capabilities relate to the packet format, protocol type and version, compression scheme, and the like.

In this example, media gateway C (22) has a port on the ATM interface 38 and a port on the IP interface 40 available to facilitate the communication session associated with the call. As such, the available communication schemes include VoATM and VoIP, and the CALL SETUP Message will identify these communication capabilities. SDP may be used to carry the communication capabilities and port addresses for communication sessions with the ATM and IP interfaces 38, 40. As illustrated, the terms "oSDP ATM" and "oSDP IP" represent communication capabilities, VoATM and VoIP, respectively, associated with ports from which the communication session can be originated.

Accordingly, media gateway controller A (24) will send a SIP-T INVITE message to media gateway controller B (24), which supports media gateway D (22), which supports the terminating telephone 28 (step 102). The INVITE message includes the two available communication schemes, which are represented by oSDP ATM and oSDP IP. The INVITE message also includes an ISUP Initial Address Message (IAM), which includes the originator phone number and the called phone number. In response, media gateway controller B (22) sends to media gateway D (22) a CALL SETUP message containing the available ports and associated communication schemes, oSDP ATM and oSDP IP (step 104). Media gateway controller B (24) will also send a 100 TRYING message to media gateway controller A (24) to indicate an attempt is being made to establish the session (step 106).

Media gateway D (22) will select a compatible one of the available ports and associated communication schemes for sending packets to media gateway C (22) during the communication session. Media gateway D (22) will then send a CALL PROGRESS message to media gateway controller B (24) (step 108). Based on the selected port and communication capabilities for sending packets to media gateway C (22), the CALL PROGRESS message will identify a port on media gateway B (24) for terminating the packet portion of the communication session and media capabilities of the identified port. The term "tSDP IP" represents the selection of VoIP for the communication session and the identification of the port and communication capabilities of the port on media gateway D (22) that will be used to receive packets from media gateway C (22).

Upon receiving the CALL PROGRESS message, media gateway controller B (24) sends to media gateway controller A (24) a 180 RINGING message with the identified termination port and associated communication capabilities (step 110). The 180 RINGING message also includes an ADDRESS COMPLETE message (ACM), which informs the originating media gateway controller A (24) that the IAM was received and that the called party is being alerted (phone ringing). Media gateway controller A (24) then sends to media gateway C (22) a CALL PROGRESS message identifying the terminating port and associated communication capabilities (step 112). The identified terminating port and associated communication capabilities (contained in tSDP) allow media gateway C (22) to identify the port on media gateway D (22) to which to send packets, and the communication scheme to use when transmitting the packets. From this information, media gateway C (22) can also determine which of the ports it originally advertised as available in the CALL SETUP message to use to receive packets. In this example, media gateway D (22) selected VoIP to send information to media gateway C (22). As such, media gateway C (22) can determine that VoIP and the advertised port on the IP interface 40 will be used for sending packets to media gateway D (22) during the communication session.

At this point, a backwards speech path using VoIP and providing audible ringing is established using VoIP from media gateway D (22) to media gateway C (22) (step 114). During this time, the telephone 28 of media gateway D (22) is ringing, and the user of telephone 28 supported by media gateway C (22) can hear a ringing signal over the backwards speech path. When the telephone 28 of media gateway D (22) is answered (step 116), media gateway D (22) sends a CALL ANSWER message to media gateway controller B (24) to inform media gateway controller B (24) that the telephone 28 has been answered (step 118). Media gateway controller B (24) will then forward a 200 OK message to media gateway controller A (24) (step 120). The 200 OK message may include an Answer Message (ANM) message, which indicates that the called party has answered.

Media gateway controller A (24) will then send a CALL ANSWER message to media gateway C (22) to initiate a two-way speech path using VoIP between media gateway C (22) and media gateway D (22) to facilitate the communication session (step 126). During operation, circuit-switched voice signals coming into the media gateway C (22) are converted to packets and sent to the identified port (tSDP) of media gateway D (22) using VoIP and associated communication capabilities. Similarly, circuit-switched voice signals coming into media gateway D (22) are converted to packets and sent to the identified port (oSDP) of media gateway D (22) using VoIP and associated communication capabilities.

Assuming the call ends by hanging up the telephone 28 supported by media gateway D (22) (step 128), a CALL RELEASE message is sent from media gateway D (22) to media gateway controller B (24) (step 130). In response to receiving the CALL RELEASE message, media gateway controller B (24) will send to media gateway controller A (24) a BYE message indicating the call has been released (step 132). Media gateway controller A (24) will send a CALL RELEASE message to media gateway controller C (22) to finalize release of the communication session (step 134). Media gateway controller A (24) will also send a 200 OK message to media gateway controller B (24) in response to the BYE message, in traditional fashion (step 136). The ports on both media gateways C and D (22) are available and may be advertised as such for a subsequent call.

Figure 5:
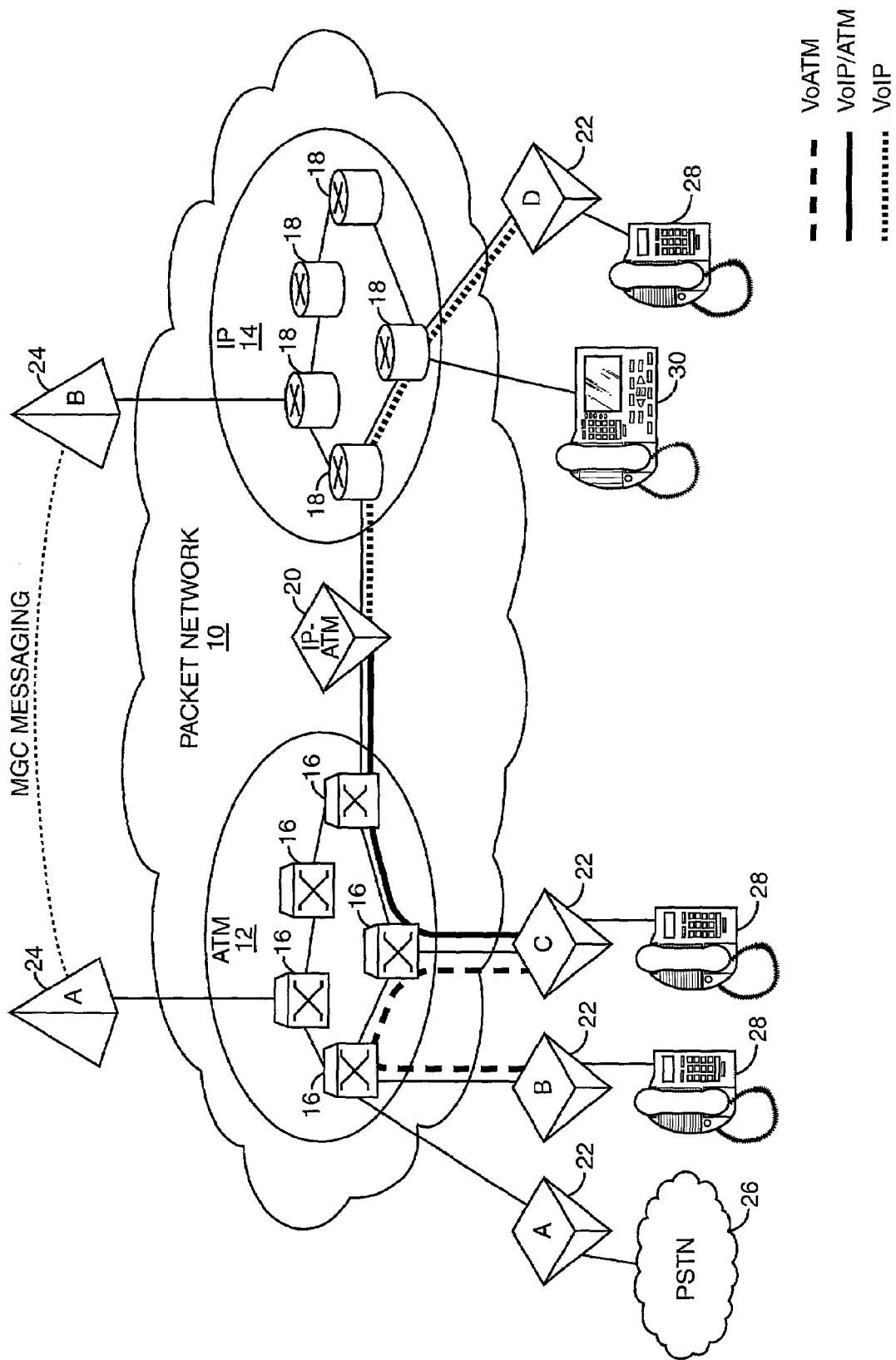
FIG. 5 is an overview of a communication network according to a second embodiment of the present invention.

Although the present example depicts the terminating media gateway only having VoIP capabilities, and thus selecting VoIP for the session, the present invention is applicable to media gateways 22 supporting any variety of communication schemes. With reference to FIG. 5, instead of using two separate physical interfaces, one for VoATM and one for VoIP, media gateway C (22) may use instead VoATM and VoIP over ATM. This way, the same physical ATM interface can be used for the different communication capabilities. Media gateway C (22) can still dynamically use one mode or the other depending on the communication capabilities of the terminating media gateway 22. For VoIP over ATM, the IP traffic can be carried over an ATM permanent virtual connection (PVC) to an interworking function (gateway 20), which removes the ATM layer and forwards the IP content to the IP network. The interworking function can be a standalone device or can be integrated in one of the ATM switch 16 or the IP router 18. As such, media gateway C (22) would still advertise VoATM and VoIP capabilities when initiating calls. If the call were directed to the telephone 28 supported by media gateway B (22), which only supports VoATM, the associated media gateway controller(s) 24 and media gateway B (22) would cooperate to select VoATM. If the call were directed to the telephone 28 supported by media gateway D (22), which only supports VoIP, the associated media gateway controller(s) 24 and media gateway B (22) would cooperate to select VoIP and use the illustrated communication path where the gateway 20 facilitates the transition between VoIP/ATM and VoIP.

In another embodiment, the originating media gateway controller 24 and terminating media gateway controller 24 are actually the same device. This would be the case if the originating and terminating points are under the control of the same media gateway controller 24. In this case, the media gateway port and communication capabilities are passed back and forth between the media gateways 22 via only one media gateway controller 24. In another embodiment, the terminating media gateway controller 24 selects the appropriate port and communication capability on behalf of the terminating media gateway 22, based on the known characteristics of the media gateways 22 available to the media gateway controller 24. This method can be used in particular in situations where multiple media gateways 22 can terminate the connection and picking one versus another media gateway 22 might be more efficient. A further improvement would add a cost metric for each of the communication capabilities to the information passed from the originating media gateway 22 to the terminating media gateway 22. This way, if the terminating media gateway 22 can use any of the capabilities, it can select the one that has the lowest cost metric, helping to optimize the network operation.

Even though the focus is provided here for interworking between two specific network types (ATM and IP), this invention can equally apply to other network types and their interworking: IPv4, multiprotocol label switching (MPLS), IPv6, ATM AAL1, ATM AAL2, Frame Relay (FR), etc. Those skilled in the art will recognize improvements and modifications to the preferred embodiments of the present invention. All such improvements and modifications are considered within the scope of the concepts disclosed herein and the claims that follow.

What is claimed is:

1. A method for providing call control comprising:
  a) receiving first information from an originating media gateway initiating a communication session, the first information bearing on a plurality of different communication schemes available at the originating media gateway for facilitating the communication session;
  b) selecting a communication scheme available at a terminating media gateway for facilitating the communication session, the selected communication scheme corresponding to one of the plurality of different communication schemes; and
  c) sending second information bearing on the selected communication scheme to the originating media gateway, wherein the originating media gateway using determines which of the plurality of communication schemes available at the originating media gateway to use for the communication session based on the second information,
  wherein the communication schemes include at least one of the group consisting of voice over ATM, voice over IP, voice over frame relay, voice over IPv4, voice over IPv6, and voice over MPLS.

2. The method of claim 1 wherein the first information includes a plurality of originating ports associated with the plurality of communication schemes, each originating port identifying a connection point used by the originating media gateway to send and receive packets for the communication session.

3. The method of claim 2 wherein the second information includes a terminating port identifying a connection point used by the terminating media gateway to send and receive packets for the communication session.

4. The method of claim 1 wherein the first information includes a plurality of originating media capabilities associated with the plurality of communication schemes, each originating media capability identifying a format for the originating media gateway to use to exchange packets with the terminating media gateway for the communication session.

5. The method of claim 4 wherein the second information includes a terminating media capability identifying a format for the terminating media gateway to use to exchange packets with the originating media gateway for the communication session.

6. The method of claim 5 wherein the first information includes a plurality of originating ports associated with the plurality of communication schemes, each originating port identifying a connection point used by the originating media gateway to send and receive packets for the communication session, and the second information includes a terminating port identifying a connection point used by the terminating media gateway to send and receive packets for the communication session.

7. The method of claim 1 wherein the first information includes a cost metric bearing on a relative cost for facilitating the plurality of communication schemes and wherein the communication scheme is selected based at least in part on the cost metric.

8. The method of claim 1 wherein the selecting step further comprises:
   a) effecting delivery of the first information to the terminating media gateway, which will select the communication scheme available at the terminating media gateway for facilitating the communication session and create the second information; and
   b) receiving the second information created by the terminating media gateway.

9. A media gateway comprising:
   a) a circuit-switched interface;
   b) at least one packet interface supporting a plurality of different communication schemes; and
   c) a control system associated with the circuit-switched interface and the at least one packet interface and adapted to:
      i) send first information to a media gateway controller to initiate a communication session with a terminating media gateway, the first information bearing on a plurality of communication schemes available for facilitating the communication session with the terminating media gateway;
      ii) receive second information bearing on a selected communication scheme available at the terminating media gateway for facilitating the communication session, the selected communication scheme corresponding to one of the plurality of different communication schemes; and
      iii) transmit packets for the communication session to the terminating media gateway using the selected communication scheme,
   wherein the communication schemes include at least one of the group consisting of voice over ATM, voice over IP, voice over frame relay, voice over IPv4, voice over IPv6, and voice over MPLS.

10. The media gateway of claim 9 wherein the first information includes a plurality of originating ports associated with the plurality of communication schemes, each originating port identifying a connection point used by the originating gateway to send and receive packets for the communication session.

11. The media gateway of claim 10 wherein the second information includes a terminating port identifying a connection point for the terminating media gateway to send and receive packets for the communication session.

12. The media gateway of claim 9 wherein the first information includes a plurality of originating media capabilities associated with the plurality of communication schemes, each originating media capability identifying a format for the control system to use to exchange packets with the terminating media gateway for the communication session.

13. The media gateway of claim 9 wherein the second information includes a terminating media capability identifying a format for the terminating media gateway to use to exchange packets with the originating media gateway for the communication session.

14. The media gateway of claim 13 wherein the first information includes a plurality of originating ports associated with the plurality of communication schemes, each originating port identifying a connection point for the originating gateway to send and receive packets for the communication session, and the second information includes a terminating port identifying a connection point for the terminating media gateway to send and receive packets for the communication session.

15. A media gateway comprising:
   a) a circuit-switched interface;
   b) an interface supporting a terminating communication scheme; and
   c) a control system associated with the circuit-switched interface and the interface and adapted to:
      i) receive first information from an originating media gateway initiating a communication session via a media gateway controller, the first information bearing on a plurality of communication schemes available for facilitating the communication session at the originating media gateway;
      ii) select a communication scheme for facilitating the communication session, the selected communication scheme corresponding to one of the plurality of different communication schemes and the terminating communication scheme; and
      iii) send second information bearing on the selected communication scheme for facilitating the communication session for delivery to the originating media gateway,
   wherein the communication schemes include at least one of the group consisting of voice over ATM, voice over IP, voice over frame relay, voice over IPv4, voice over IPv6, and voice over MPLS.

16. The media gateway of claim 15 wherein the control system is adapted to transmit packets for the communication session to the originating media gateway using the selected communication scheme.

17. The media gateway of claim 15 wherein the first information includes a plurality of originating ports associated with the plurality of communication schemes, each originating port identifying a connection point for the originating media gateway to send and receive packets for the communication session.

18. The media gateway of claim 17 wherein the second information includes a terminating port identifying a connection point to send and receive packets for the communication session.

19. The media gateway of claim 15 wherein the first information includes a plurality of originating media capabilities associated with the plurality of communication schemes, each originating media capability identifying a format for the originating media gateway to use to exchange packets with the terminating media gateway for the communication session.

20. The media gateway of claim 19 wherein the second information includes a terminating media capability identifying a format to use to send packets to the originating media gateway for the communication session.

21. The media gateway of claim 20 wherein the first information includes a plurality of originating ports associated with the plurality of communication schemes, each originating port identifying a connection point for the originating media gateway to send and receive packets for the communication session, and the second information includes a terminating port identifying a connection point to send and receive packets for the communication session.

22. A system for providing call control comprising:
a) means for receiving first information from an originating media gateway initiating a communication session, the first information bearing on a plurality of different communication schemes available at the originating media gateway for facilitating the communication session;
b) means for selecting a communication scheme available at a terminating media gateway for facilitating the communication session, the selected communication scheme corresponding to one of the plurality of different communication schemes; and
c) means for sending second information bearing on the selected communication scheme to the originating media gateway, wherein the originating media gateway using determines which of the plurality of communication schemes available at the originating media gateway to use for the communication session based on the second information,
wherein the communication schemes include at least one of the group consisting of voice over ATM, voice over IP, voice over frame relay, voice over IPv4, voice over IPv6, and voice over MPLS.

23. The system of claim 22 wherein the first information includes a plurality of originating ports associated with the plurality of communication schemes, each originating port identifying a connection point for the originating media gateway to send and receive packets for the communication session.

24. The system of claim 23 wherein the second information includes a terminating port identifying a connection point for the terminating media gateway to send and receive packets for the communication session.

25. The system of claim 22 wherein the first information includes a plurality of originating media capabilities associated with the plurality of communication schemes, each originating media capability identifying a format for the originating media gateway to use to exchange packets with the terminating media gateway for the communication session.

26. The system of claim 25 wherein the second information includes a terminating media capability identifying a format for the terminating media gateway to use to exchange packets with the originating media gateway for the communication session.

27. The system of claim 26 wherein the first information includes a plurality of originating ports associated with the plurality of communication schemes, each originating port identifying a connection point for the originating media gateway to send and receive packets for the communication session, and the second information includes a terminating port identifying a connection point for the terminating media gateway to send and receive packets for the communication session.

28. The system of claim 22 further comprising:
a) means for effecting delivery of the first information to the terminating media gateway, which will select the communication scheme available at the terminating media gateway for facilitating the communication session and create the second information; and
b) means for receiving the second information created by the terminating media gateway.

29. A method for providing call control comprising:
a) receiving first information from an originating media gateway initiating a communication session, the first information bearing on a plurality of different communication schemes available at the originating media gateway for facilitating the communication session;
b) selecting a communication scheme available at a terminating media gateway for facilitating the communication session, the selected communication scheme corresponding to one of the plurality of different communication schemes; and
c) sending second information bearing on the selected communication scheme to the originating media gateway, wherein the originating media gateway using determines which of the plurality of communication schemes available at the originating media gateway to use for the communication session based on the second information,
wherein the first information includes a plurality of originating ports associated with the plurality of communication schemes, each originating port identifying a connection point used by the originating media gateway to send and receive packets for the communication session.

30. A media gateway comprising:
a) a circuit-switched interface;
b) at least one packet interface supporting a plurality of different communication schemes; and
c) a control system associated with the circuit-switched interface and the at least one packet interface and adapted to:
i) send first information to a media gateway controller to initiate a communication session with a terminating media gateway, the first information bearing on a plurality of communication schemes available for facilitating the communication session with the terminating media gateway;
ii) receive second information bearing on a selected communication scheme available at the terminating media gateway for facilitating the communication session, the selected communication scheme corresponding to one of the plurality of different communication schemes; and
iii) transmit packets for the communication session to the terminating media gateway using the selected communication scheme,
wherein the first information includes a plurality of originating ports associated with the plurality of communication schemes, each originating port identifying a connection point used by the originating gateway to send and receive packets for the communication session.

31. A media gateway comprising:
a) a circuit-switched interface;
b) an interface supporting a terminating communication scheme; and
c) a control system associated with the circuit-switched interface and the interface and adapted to:
i) receive first information from an originating media gateway initiating a communication session via a media gateway controller, the first information bearing on a plurality of communication schemes available for facilitating the communication session at the originating media gateway;

ii) select a communication scheme for facilitating the communication session, the selected communication scheme corresponding to one of the plurality of different communication schemes and the terminating communication scheme; and
iii) send second information bearing on the selected communication scheme for facilitating the communication session for delivery to the originating media gateway, wherein the first information includes a plurality of originating ports associated with the plurality of communication schemes, each originating port identifying a connection point for the originating media gateway to send and receive packets for the communication session.

\* \* \* \* \*